United States Patent
Charlas

(10) Patent No.: US 10,236,120 B2
(45) Date of Patent: Mar. 19, 2019

(54) MANUFACTURE OF COILS FOR ELECTROTECHNICAL COMPONENTS USING STRIPS OF UNSEALED ANODIZED ALUMINUM

(71) Applicant: LABINAL POWER SYSTEMS, Blagnac (FR)

(72) Inventor: Mathieu Charlas, Tarbes (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 409 days.

(21) Appl. No.: 14/782,763

(22) PCT Filed: Apr. 3, 2014

(86) PCT No.: PCT/FR2014/050810
§ 371 (c)(1),
(2) Date: Oct. 6, 2015

(87) PCT Pub. No.: WO2014/167223
PCT Pub. Date: Oct. 16, 2014

(65) Prior Publication Data
US 2016/0071645 A1 Mar. 10, 2016

(30) Foreign Application Priority Data
Apr. 8, 2013 (FR) .................................... 13 53146

(51) Int. Cl.
| H01F 41/04 | (2006.01) |
| H01F 41/06 | (2016.01) |
| H01F 41/061 | (2016.01) |
| H01F 5/06 | (2006.01) |
| H01B 1/02 | (2006.01) |
| H01F 41/063 | (2016.01) |
| C25D 11/24 | (2006.01) |
| C25D 11/20 | (2006.01) |
| C25D 11/18 | (2006.01) |
| C08G 73/10 | (2006.01) |

(52) U.S. Cl.
CPC ............ *H01F 41/04* (2013.01); *H01B 1/023* (2013.01); *H01F 5/06* (2013.01); *H01F 41/06* (2013.01); *H01F 41/061* (2016.01); *H01F 41/063* (2016.01); *C08G 73/1003* (2013.01); *C08G 73/105* (2013.01); *C25D 11/18* (2013.01); *C25D 11/20* (2013.01); *C25D 11/246* (2013.01)

(58) Field of Classification Search
CPC ........ H01F 41/04; H01F 41/06; H01F 41/061; H01F 41/063; H01F 5/06; H01B 1/023; C25D 11/18; C25D 11/20; C25D 11/246; C08G 73/1003; C08G 73/105
See application file for complete search history.

(56) References Cited

U.S. PATENT DOCUMENTS

| 3,574,071 A * | 4/1971 | Covino ................. C25D 11/18 205/118 |
| 3,715,211 A | 2/1973 | Quaintance |
| 3,775,266 A * | 11/1973 | Ikeda ..................... C25D 11/18 205/201 |
| 4,939,001 A * | 7/1990 | Brodalla .............. C25D 11/246 205/204 |
| 2005/0048297 A1* | 3/2005 | Fukuda ................ C08G 73/105 428/458 |
| 2008/0179074 A1 | 7/2008 | Elie et al. |
| 2012/0225784 A1 | 9/2012 | Piascik et al. |

FOREIGN PATENT DOCUMENTS

| DE | 2451232 A1 | 5/1976 |
| EP | 0 441 061 A1 | 8/1991 |
| GB | 773911 A | 5/1957 |
| GB | 1 255 336 A | 12/1971 |
| GB | 1394361 A | 5/1975 |
| GB | 2432260 A | 5/2007 |
| JP | 06036923 A * | 2/1994 |

OTHER PUBLICATIONS

International Search Report dated May 27, 2014, issued in corresponding International Application No. PCT/FR2014/050810, filed Apr. 3, 2014, 2 pages.
Written Opinion of the International Searching Authority dated May 27, 2014, issued in corresponding International Application No. PCT/FR2014/050810, filed Apr. 3, 2014, 7 pages.
International Preliminary Report on Patentability dated Oct. 13, 2015, issued in corresponding International Application No. PCT/FR2014/050810, filed Apr. 3, 2014, 1 page.
Search Report dated Feb. 27, 2018, issued in corresponding Russian Application No. 2015143925/07, filed Apr. 3, 2014, 2 pages.

* cited by examiner

*Primary Examiner* — A. Dexter Tugbang
(74) *Attorney, Agent, or Firm* — Christensen O'Connor Johnson Kindness PLLC

(57) ABSTRACT

A method for manufacturing a strip of impregnated anodized aluminum, for use in a coil of an electrotechnical component, said coil including an interstitial material providing dielectric cohesion and insulation functions, said interstitial material being suitable for cross-linking, in other words for forming, by chemical reactions between the components thereof when subjected to certain physical conditions, molecular structures being organized in a lattice, the method comprising: a step of applying the precursor mixture of said interstitial material to the anodized aluminum; at least one step of cross-linking the precursor mixture in order to form said interstitial material on the strip of aluminum; wherein the anodized aluminum has not been subjected to the sealing of the pores of the alumina formed by anodization prior to the application of the precursor mixture of said interstitial material.

8 Claims, No Drawings

MANUFACTURE OF COILS FOR ELECTROTECHNICAL COMPONENTS USING STRIPS OF UNSEALED ANODIZED ALUMINUM

TECHNICAL FIELD

Embodiments of the present disclosure relate to inductive electrotechnical equipment such as inductors, transformers or electric motors. It relates more particularly to the production of the coils used in these components.

BACKGROUND

In order to create a magnetic field, the coils must be formed from conductive wires coated with a layer of insulating material. Any failure of this insulating material would result in short-circuiting the turns and therefore reducing the inductance of the coil.

The coils are usually formed from copper wire. Currently, the insulation of the wires is produced with thermosetting polymer materials such as polyester, polyamide, polyepoxide or polyimide varnishes, according to the specified requirements for resistance to temperature. Once the insulating wire coils have been produced, they are additionally impregnated with another layer of resin. These solutions make it possible to produce compact coils that are satisfactory for normal applications.

Aeronautical applications require optimization of these solutions in terms of mass and volume. A first way consists of optimizing the proportion of the volume of conductor to the total volume of the insulated coil. The use of copper wires with a rectangular cross section, for example, meets this objective by limiting the interstices compared with wires with a circular cross section.

However, in order to further save in weight, aluminum is used in place of copper. In fact, the use of aluminum strips for manufacturing coils combines the advantage of compact geometry and a low-density conductive material.

In addition, the use of anodizing for electrically insulating aluminum is a very mature solution that also has the advantage of having a resistance to temperature very much greater than current solutions.

Consequently, anodized aluminum coils that can be used for producing electrotechnical components are currently being sold. They are supplied to the dimensions of the component and all that remains to be done then is to integrate them in the latter with, in particular, additional impregnation with resin.

However, the use of these coils has several drawbacks:
firstly, the aluminum is immediately sealed with hot water after anodizing, which has the effect of blocking the pores of the alumina formed during anodizing and thus of reducing the adhesion properties of this surface, and therefore of reducing the service life of the component;
in addition, manufacturing the coil requires the use of an adhesive in order to bond the anodized aluminum strips to one another; the use of this adhesive introduces an additional material, the uncontrolled interface of which with the resin used for the additional impregnation in the component reduces the durability of the component.

SUMMARY

The aim of the disclosure is to remedy the aforementioned defects.

It relates to a method for manufacturing a strip of impregnated anodized aluminum, intended to be used in a coil of an electrotechnical component, the coil comprising an interstitial material providing the functions of cohesion and dielectric isolation, the interstitial material being obtained from a precursor mixture able to cross-link, the method comprising:
a step of applying the precursor mixture of the interstitial material to the anodized aluminum,
at least one step of cross-linking the precursor mixture in order to form the interstitial material on the aluminum strip.

This method is distinctive in that the anodized aluminum has not undergone sealing of the pores of the alumina formed by anodizing before application of the precursor mixture of the interstitial material.

In a known manner, cross-linking of the precursor mixture consists of forming, by chemical reactions between its components when this mixture is subjected to certain physical conditions, molecular structures organized in a lattice.

Replacing the operation of sealing with hot water with that of impregnation of the precursor mixture of interstitial material able to cross-link makes it possible to create ideal adhesion conditions on the surface of the anodized aluminum with this same interstitial material when it will be used for manufacturing the coil in the electrotechnical component. This is because, since the porous alumina created at the end of anodizing is impregnated with the interstitial material, the interface therewith will thus be very close and therefore durable.

Preferably, the precursor mixture used in the method comprises a resin and a hardener. Generally, it is said that this resin is thermosetting since cross-linking of the precursor mixture takes place.

Advantageously, so that the resin has the required properties of resistance to voltage and dielectric isolation under the operating conditions of aeronautical components, at least one component chosen from polyepoxides, polyamides or silicones forms part of its formulation.

In a preferred variant, when the interstitial material is thermosetting resin, strips of anodized aluminum pre-impregnated by the initial method, in which the cross-linking step is incomplete, are manufactured.

Merely starting the cross-linking step makes it possible to store these pre-impregnated anodized aluminum strips, preferably at low temperature, in order to reuse them later.

In a variant embodiment, the interstitial material is a material used by a sol-gel method. Although the chemical reactions transforming the precursor mixture are very different through their nature and their temperature cycle from those of a thermosetting resin, they perform a kind of cross-linking resulting in a material having a structure in space that did not exist in the precursor mixture. Sol-gel methods have the advantage of making it possible to obtain various materials, some, for example, having better resistance to temperature than resins.

In fact, embodiments of the disclosure also relate to a method for manufacturing an electrotechnical component comprising at least one coil, the coil comprising a strip of anodized aluminum wound in turns and an interstitial material fulfilling the functions of cohesion and dielectric isolation, wherein:
the anodized aluminum strip is impregnated according to any of the preceding claims;
at least one step of definitive cross-linking of the precursor mixture in order to form the interstitial material on the aluminum strip is performed when the latter is formed to the dimensions of the coil.

In such a configuration, some of the electrical insulation between the windings of the coil is provided by the anodized aluminum layer on the strips. The interstitial material for its part fulfils the function of protection and cohesion in order to maintain the coil in the specified form. It also provides additional dielectric isolation between the aluminum strips. In addition, the method thus makes it possible to have a single material enveloping the aluminum strips in the coil and eliminates undesirable interfaces between various materials.

Advantageously, when the interstitial material is resin, the method for manufacturing the electrotechnical component described above is adapted using the strip of pre-impregnated anodized aluminum, which is then formed to the dimensions of the coil and undergoes the definitive cross-linking step.

The disclosure also concerns the pre-impregnated anodized aluminum strips and the electrotechnical components obtained by the aforementioned methods.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Anodizing aluminum is a controlled oxidation of the surface of the part, here the aluminum strip. For example, according to a known method, the creation of the anodic layer is the result of passing a current through an electrolyte. The anodizing tank contains, for example but in a non-limiting manner, a phosphoric acid solution in which the aluminum strip is placed. A direct current is applied for a given period in order to create the anodic layer of specified thickness, of approximately ten microns.

The layer of alumina thus created is an excellent electrical insulator. It also has good mechanical properties. However, it has a honeycomb structure, with micropores, which allows impurities to pass, leading to corrosion of the aluminum strip over time.

For this reason, anodized aluminum products, in particular when they must be stored, undergo a so-called sealing operation. This operation consists of a hydration of the anodic layer, the result of which is causing the walls of the cells to swell and obstructing the holes therein. This operation is generally performed by soaking the anodized aluminum in hot water, controlling the temperature and the duration.

Unfortunately for the application sought, the anodized aluminum thus sealed has lost its surface properties. In particular, the honeycomb alumina is more able to bind with an adhesive material than the coating of hydrate obtained after sealing.

A first use of the disclosure consists in a transposition of the concept of pre-impregnation used in the industry of composite materials comprising an organic matrix in the case where the matrix is an unsealed anodized aluminum strip, and the impregnation material is the resin that ultimately will be used to manufacture the coil in the component.

In fact, the thermosetting resin, which is a mixture of polymers and other ingredients, for which there exist a plurality of known formulations according the type of application, will, during the steps of the method, be in several states. In its final state, as the coil cohesion material, the resin is a solid material, having suitable properties of mechanical strength. However, this solid state is obtained from a malleable fluid form, by a so-called cross-linking method. Generally this method is a heat treatment. It organizes the molecular structure of the polymer in a lattice in order to give it its solid form. In the present document, the resin in its fluid state before cross-linking will be referred to hereinafter as the precursor mixture. In a known manner, this precursor mixture contains a resin belonging to the following group: polyimide, polyepoxide, polyamide, polyamide-imide, polyester, polyesterimide, silicone, phenolic or polyurethane. In a known manner, it also contains a hardener which reacts with the resin in order to cause the cross-linking. It may contain additives assisting the overall process, such as solvents and catalysts. In the case of known thermosetting resins, this cross-linking may be done in an incomplete manner. This makes it possible to give a first gelled form to the resin and thus to store it in order then to resume and complete the cross-linking process. During the final cross-linking process, two pretreated resin layers can thus be welded together as if they had formed only a single element.

The first step of the process of producing the coil of the component is therefore the manufacture of the unsealed anodized aluminum strip. Next, the production of the pre-impregnated aluminum strip comprises three important steps.

A first step consists of depositing, on the aluminum strip that has just been anodized and not sealed, a layer of precursor mixture of the resin that will be used for manufacturing the coil in the electrotechnical component. Preferably, the precursor comprises at least one solvent that gives it the rheological properties necessary for being deposited evenly and penetrating the pores of the anodized aluminum layer, in order to bind closely with the latter. Known methods, by spraying or dipping, exist for providing a uniform deposition of precursor mixture and good penetration through the pores of the anodized layer.

A second step, of incomplete cross-linking, consists of an intermediate heat treatment that starts the cross-linking and gels the polymer. In the gelled state, the resin and hardener have reacted sufficiently to begin a three-dimensional lattice and to enable the product to adhere to the anodized aluminum. On the other hand, the rigidity of the material is still very low. This state is advantageous since it makes it possible to form a protective layer adhering correctly to the anodized aluminum strip in order to store it before integrating it with a component and, especially, as will be seen later, to resume the cross-linking process in order to ensure cohesion of the product.

Finally, a third step of storage at low temperature (−20° C. in general) is necessary for stabilizing the material and dispatching the pre-impregnated anodized aluminum strip to the place of production of the final part. In a first variant, the pre-impregnated aluminum strips are formed in coils having the dimensions of the electrotechnical component to be produced before being stored. In a second variant, the coils are not preformed and it is the pre-impregnated strip that will be used as required.

The production of the coil of the electrotechnical component from such a pre-impregnated anodized aluminum strip also comprises three main steps.

In a first step, the pre-impregnated anodized aluminum strip is heated to ambient temperature in order to be able to be placed in the electrotechnical component. According to the variant chosen for storage, it is the completely ready coil that is installed. Otherwise the pre-impregnated aluminum strip at ambient temperature is previously wound to the dimensions of the coil of the electrotechnical component.

In a second step of complete impregnation, the entire component is coated with resin, including the coil or coils that make it up.

The last step consists of a complete heat treatment that results in a final cross-linking of the resin around the unsealed anodized aluminum strips, wound according to the form of the coil of the component.

In this step, the gelled resin layers of two superimposed pre-impregnated strips fuse together and with the resin that coats the component, by virtue of the fact that their incomplete molecular lattice allows recombination with the adjacent material. Therefore the only interface remaining is that between the resin and the unsealed, the adhesion characteristics of which were provided as from pre-impregnation.

In order to implement this disclosure, it is important for the resin to have:
 the rheological properties making it possible to coat the anodized aluminum strips with a layer of polymer to a sufficient thickness to fulfil its role of electrical insulation;
 the rheological properties allowing penetration of the resin through the pores of the alumina issuing from the aluminizing method;
 a resistance to electrical voltage compatible with the electrotechnical component;
 a resistance to temperature compatible with the applications sought;
 a gelling time compatible with the anodizing method;
 a cross-linking temperature higher than the temperature of the component.

Resins based on polyepoxide, polyimide or silicone are preferably used in order to have the necessary properties in the operating temperature range as well as the voltage levels envisaged for electrotechnical applications in on-board aeronautics. Resins of this type are already used in the manufacture of inductive coils according to the prior art. Moreover, the cross-linking temperature of resins of this type makes it possible to use them for components where the windings experience temperatures of approximately 250° C.

The rheological properties necessary for the resin for application to anodized aluminum are obtained by means of dilution in organic solvents. The proportion of solvent adjusting the viscosity level of the resin is defined by experimentation for each aforementioned resin formulation.

A variant of the disclosure consists of replacing the resin with a material used by sol-gel method. The sol-gel method makes it possible, by a polymerization of molecular precursors in solution, to obtain vitreous materials without passing through the fusion step. It is in particular possible to obtain mineral solid materials having the required dielectric properties from organo-mineral sol-gel mixtures.

Although the chemical processes are different from the case of the cross-linking of a thermosetting resin, the coating of an unsealed anodized aluminum strip with a material via a sol-gel method is done in a similar manner in two steps:
 a step of applying the precursor mixture to the aluminum strip, for example by spraying;
 a step of cross-linking by heat treatment, rather referred to as polymerization with the materials used in a sol-gel method, where the reactions with the precursor elements in the precursor mixture form the final material.

For use in the disclosure, a precursor mixture of the type comprising water, acetic acid, methanol, isopropanol and an organosilane material is for example used. Complementary components such as aluminum hydrates make it possible to obtain the required dielectric properties.

Advantageously, use is also made of inorganic polymers for obtaining ceramics, in a known manner, with a sol-gel method. Ceramics have mechanical and thermal properties that make it possible to use the coils obtained by the method in components wherein the temperatures may reach 250° C. and the operating electrical voltage 2 kV.

In the case of the use of the sol-gel method, the process does not involve use of a pre-impregnated or pretreated strip. This is because, in the case of the sol-gel method, the "cross-linking" process, once started, must be completed. There is no intermediate "gelled" state that would have useful plastic properties. The steps of manufacturing the coil of the component are therefore:
 formation of the unsealed anodized aluminum strip in the shape of the final coil;
 application of the precursor mixture for the sol-gel method so that it is closely bonded to the anodized aluminum and fills the volume of the coil;
 application of the cross-linking heat treatment in order to obtain the end product.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A method for manufacturing a strip of impregnated anodized aluminum for use in a coil of an electrotechnical component, said coil comprising an interstitial material providing functions of cohesion and dielectric isolation, said interstitial material being obtained from a precursor mixture able to cross-link, said method comprising:
 a step of anodizing a strip of aluminum to form a strip of anodized aluminum with an aluminum oxide layer which comprises pores,
 a step of applying the precursor mixture of said interstitial material to the anodized aluminum,
 at least one partial step of cross-linking the precursor mixture in order to form said interstitial material on the strip of anodized aluminum,
 wherein the strip of anodized aluminum has not undergone sealing of the pores of the aluminum oxide layer from the step of anodizing the strip of aluminum, and
 wherein the precursor mixture is in an intermediate state where the precursor mixture is gelled from the at least one partial step of cross-linking the precursor mixture.

2. The method according to claim 1, wherein the precursor mixture comprises a resin and a hardener.

3. The method according to claim 2, wherein at least one component chosen from polyepoxides, polyimides or silicones forms part of a formulation of the resin.

4. The method according to claim 2, wherein the cross-linking step is incomplete such that the cross-linking is an intermediate heat treatment.

5. The method according to claim 1, wherein the method comprises a step of storing the strip of anodized aluminum in an intermediate state at a low temperature.

6. The method according to claim 5, wherein the low temperature is around −20° C.

7. A method for manufacturing an electrotechnical component comprising at least one coil, said at least one coil comprising a strip of anodized aluminum wound in turns and an interstitial material fulfilling functions of cohesion and dielectric isolation, wherein the strip of anodized aluminum is impregnated comprising:
- a step of anodizing a strip of aluminum to form the strip of anodized aluminum with an aluminum oxide layer which comprises pores;
- a step of applying a precursor mixture of said interstitial material to the strip of anodized aluminum;
- at least one partial step of cross-linking the precursor mixture in order to form said interstitial material on the strip of anodized aluminum,
  wherein the strip of anodized aluminum has not undergone sealing of the pores of the aluminum oxide layer from the step of anodizing the strip of aluminum,
  the precursor mixture is in an intermediate state where the precursor mixture is gelled from the at least one partial step of cross-linking the precursor mixture; and
- at least one step of definitive cross-linking of the precursor mixture in order to form said interstitial material on the strip of anodized aluminum is performed when the strip of anodized aluminum is formed to dimensions of the at least one coil.

8. The method according to claim 7, wherein the at least one partial cross-linking step is incomplete before forming the strip of anodized aluminum to the dimensions of the at least one coil and subjecting the strip of anodized aluminum to the definitive cross-linking step.

* * * * *